June 30, 1970  E. WEICHEL  3,517,842

METHOD FOR LOADING, TRANSPORTING AND UNLOADING BULK MATERIALS

Original Filed Nov. 29, 1965  3 Sheets-Sheet 1

INVENTOR
ERNST WEICHEL
BY Dicke & Craig
ATTORNEYS

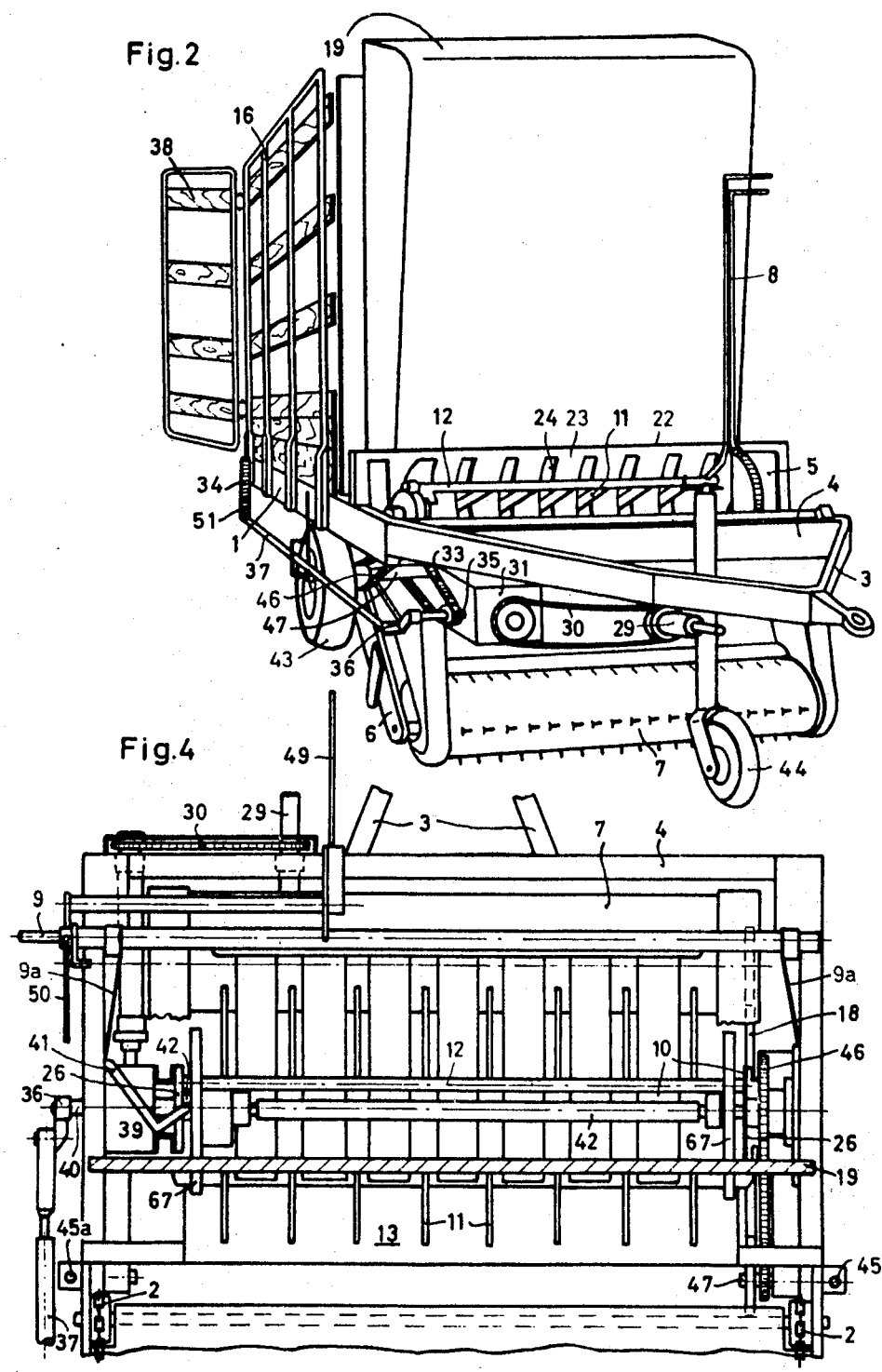

June 30, 1970  E. WEICHEL  3,517,842
METHOD FOR LOADING, TRANSPORTING AND UNLOADING BULK MATERIALS
Original Filed Nov. 29, 1965  3 Sheets-Sheet 3
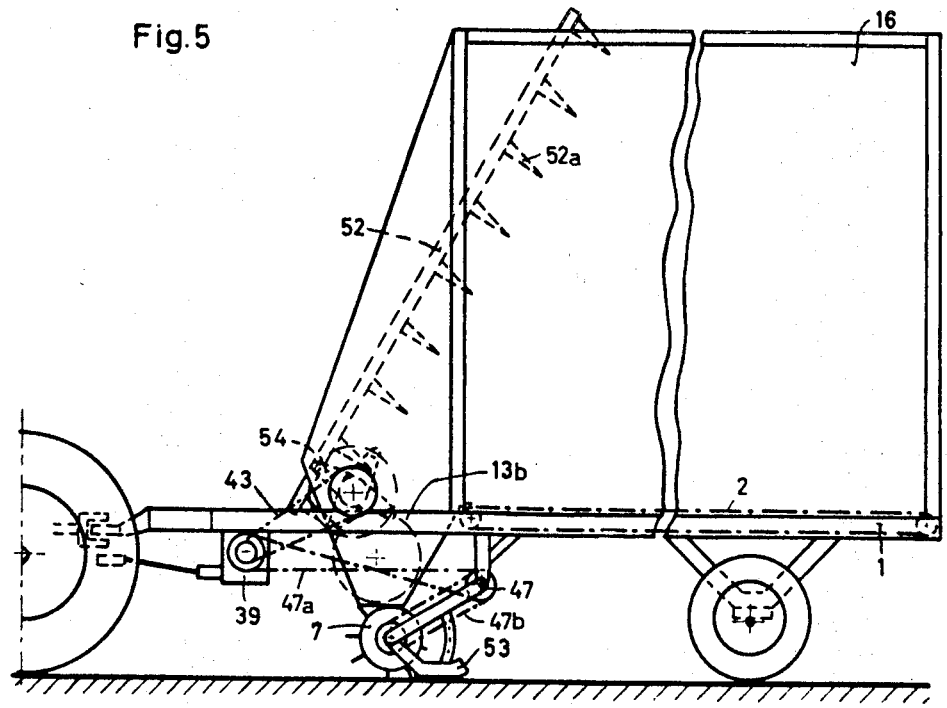
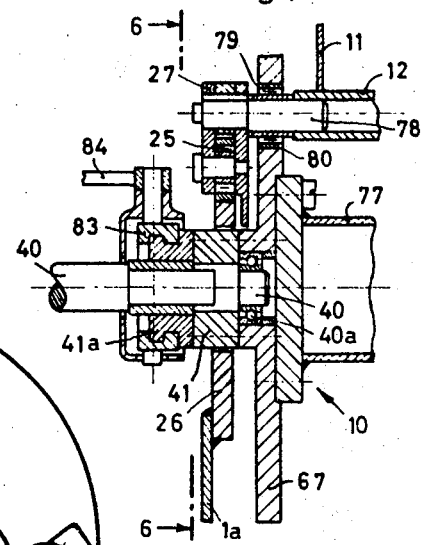
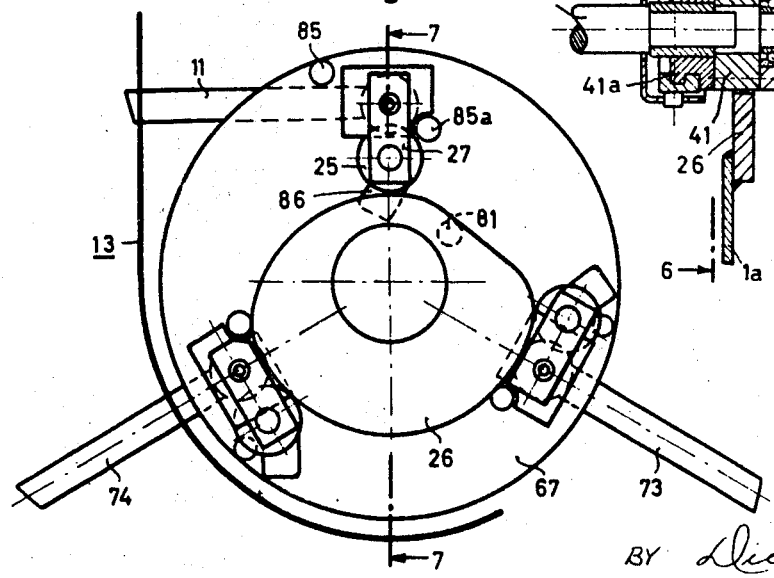
INVENTOR
ERNST WEICHEL
BY Dicke + Craig
ATTORNEYS United States Patent Office 3,517,842
Patented June 30, 1970

3,517,842
METHOD FOR LOADING, TRANSPORTING AND UNLOADING BULK MATERIALS
Ernst Weichel, Heiningen, near Goppingen, Germany
Continuation of application Ser. No. 510,343, Nov. 29, 1965. This application July 24, 1968, Ser. No. 753,830
Claims priority, application Germany, Nov. 15, 1960, W 28,917
Int. Cl. B65g *19/04;* A01d *91/00*
U.S. Cl. 214—152
5 Claims

ABSTRACT OF THE DISCLOSURE

A method for loading, transporting and unloading bulk agricultural material in various forms, for example, blades, stalks and the like, including the steps of picking up the various materials from the ground, delivering them to a loading area, applying force to the materials to move them in an upward and a longitudinal direction, with respect to the loading area, thus compressing the material within this area, and finally, carrying off the material in a substantially longitudinal direction.

---

The present application is a continuation of application Ser. No. 510,343, filed Nov. 29, 1965, now abandoned, and a division of copending application Ser. No. 115,208 filed June 6, 1961, now U.S. Pat. No. 3,252,277 and relates to a method for the loading, transporting and unloading of bulk agricultural materials of all sorts, for example, hay, green fodder, straw, etc., particularly of blades, stalks and similar materials.

An economic loading method has to fulfill the following requirements of agriculture: high output per hour, low power consumption, short periods for preparation, true one man-operation by the tractor driver, adaptability to various unloading devices, suitability for green, withered and dry fodder.

Many working methods and machines are known for the loading of cereal crops, e.g., rear loaders, field chaffcutters, front loaders, fodder loaders, balers, etc. Although the same fulfill one or more of the requirements of agriculture mentioned hereinabove, all these known working methods or machines have the disadvantage in common that—owing to their actual principle of operation—they cannot fulfill at least one or more of these important requirements of agriculture at all or can fulfill them only insufficiently.

The invention provides a method for the loading and compressing of blades, stalks, and similar materials which fulfills the above requirements equally well. Briefly stated, this unique method comprises the steps of picking up the materials from the soil, pushing them into a loading space and applying upward and substantially horizontal forces to said materials in said loading space.

Further details of the invention are disclosed in the following description of some embodiments thereof given by way of example with reference to the accompanying drawings, in which:

FIG. 2 is a view of the machine of FIG. 1 as seen at an angle from the front;

FIG. 4 is a plan view of the embodiment of FIG. 3;

FIG. 5 is a diagrammatic side elevation of another embodiment of the invention;

FIG. 6 is a side elevation taken along line 6—6 of FIG. 7, showing the bearing construction of the conveyor drum and the operating means for prongs carried thereby;

FIG. 7 is a section taken along line 7—7 of FIG. 6.

Corresponding components in each embodiment are denoted throughout the various views by identical reference characters wherever possible.

The main features of the invention are now described in connection with FIGS. 1 to 4, 6 and 7, which illustrate various mechanisms capable of performing the method.

Figure 1:
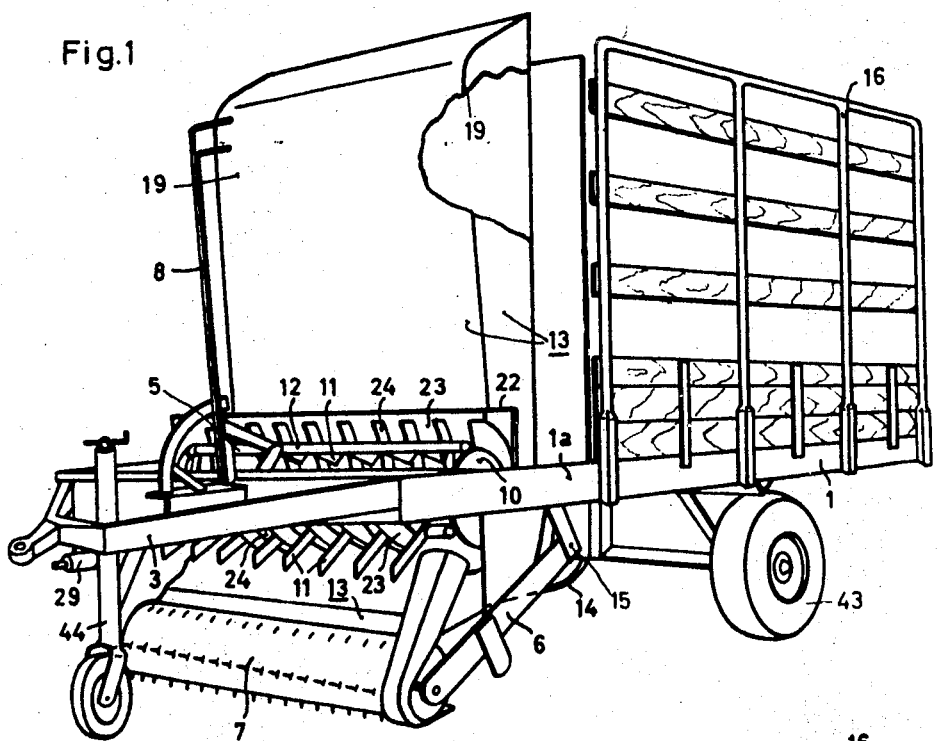
FIG. 1 is a perspective view of an embodiment of the machine according to the invention as seen from the left.

Looking first to the embodiment of FIGS. 1 and 2, the chassis 1 of a single axle-trailer is extended in front in such a manner that between the extensions 1a whereon tongue means 3 are secured, the traverse member 4 and a roller or scraper floor 2 on said chassis 1, a recess 5 is formed for the accommodation of a loading device. The same comprises a pick-up drum 7, which is mounted on a cantilever tiltable about a pivot 15, and a conveyor drum 10 journalled on the extensions 1a which bear a plurality of pivotally mounted rakes 12 studded with prongs 11, the direction of rotation of which is the opposite of that of the pick-up drum 7. The prongs 11 of the pivotally mounted rakes 12 of the conveyor drum 10 move in and out of a conveyor duct 13, the bottom 14 of which forms a substantially circular arc coaxial with the axis of the conveyor drum 10, and which terminates at its upper end at the level of the floor 2 of the vehicle in the vertical direction.

The superstructure 16 of the vehicle has a front wall 19, the lower part of which is continued at 22 by a grate 23 which has slots 24 matching the prongs 11. The grate 23 substantially coaxially surrounds the conveyor drum 10 and is fixed at its lower end to the transverse member 4. Since the prongs 11 protrude only through the slots 24 in the grate 23 into the conveyor duct 13, any coiling of the material conveyed about the conveyor drum 10 is prevented.

The pivotally mounted rakes 12 of the conveyor drum 10 are controlled by means of follow-up rollers and cams in such a manner that they stand perpendicular to the conveyor duct while passing through the same and are withdrawn from the fodder or the duct 13, respectively, in the direction of driving the vehicle, when substantially at the level of the loading area thereof.

A suitable mechanism for this purpose is shown in FIGS. 6 and 7. As shown therein, the conveyor drum 10 consists of a sturdy axle 77 which may be made of a tube, at each end (only the driving end shown) of which a disc 67 is fixed for the mountings of the rakes 12 which are constructed as pins 78 with roller bearings 79 in bores 80. The free ends of the pins 78 have lugs 27 with the follower rollers 25. The latter contact a cam disc 26, which is fixed on one of the extensions 1a outside the conveyor drum 10. On the driving end of the conveyor drum the same is journalled freely rotatable by means of a bearing 40a on the shaft 40 of a worm gearing 39 (see FIG. 4), and is fixedly connected with one half of a dog clutch 41. On the shaft 40 of the worm gearing the other half 41a of the dog clutch 41 is attached (as by splines) in such a manner that it is restrained from relative rotation but slidable axially by means of a collar 83 engaging into the slidable half 41a and a lever 84. The stationary cam disc 26 is so shaped that the prongs 11 stand substantially radially with respect to the circumference of the conveyor drum between the positions 73 and 74. Then they are tipped about 90°, because the rollers 25 engage the lower part of cam disc 26, so that when leaving the conveyor channel 13 they stand substantially tangential to the circumference of the conveyor drum 10. By the stop 81 mounted on the cam disc 26, which is abutted by an extension 86 of the lug 27 when the prong 11 has been withdrawn from the conveyor channel 13, the prongs are restored to the starting position. The stops 85 and 85a confine the range of tilting of the prongs to approximately 90° even when the follower rollers 25 cannot contact the cam disc 26.

In the embodiment of FIGS. 1 and 2, the conveyor drum 10 is driven by means of a chain 33 from a gear box 31, the drive of the pick-up drum 7 being derived from the conveyor drum 10 by chain 46 and belt 18 in a manner similar to that described below in connection with the embodiment illustrated in FIGS. 3 and 4. The gear box 31 is driven from the tractor by means of its power take-off shaft through the connector shaft 29 and the chain drive 30.

The advance of the roller or scraper floor 2 is effected by a known step drive 34 (FIG. 2) and pusher pawl 51 combination which is moved in a manner known per se at a variable stroke by means of a pull rod 37, which is articulated to an eccentric 36 keyed to the shaft 35 of the gear box. The advance of the roller or scraper floor at each stroke of the pusher pawl is accordingly steplessly controllable. It may be operated together with the pick-up and conveyor-drums or separately.

In the embodiment of FIGS. 1 and 2, the pick-up drum 7 is adjustable in height by means of a lever 8 connected to cantilever 6.

Figure 3:
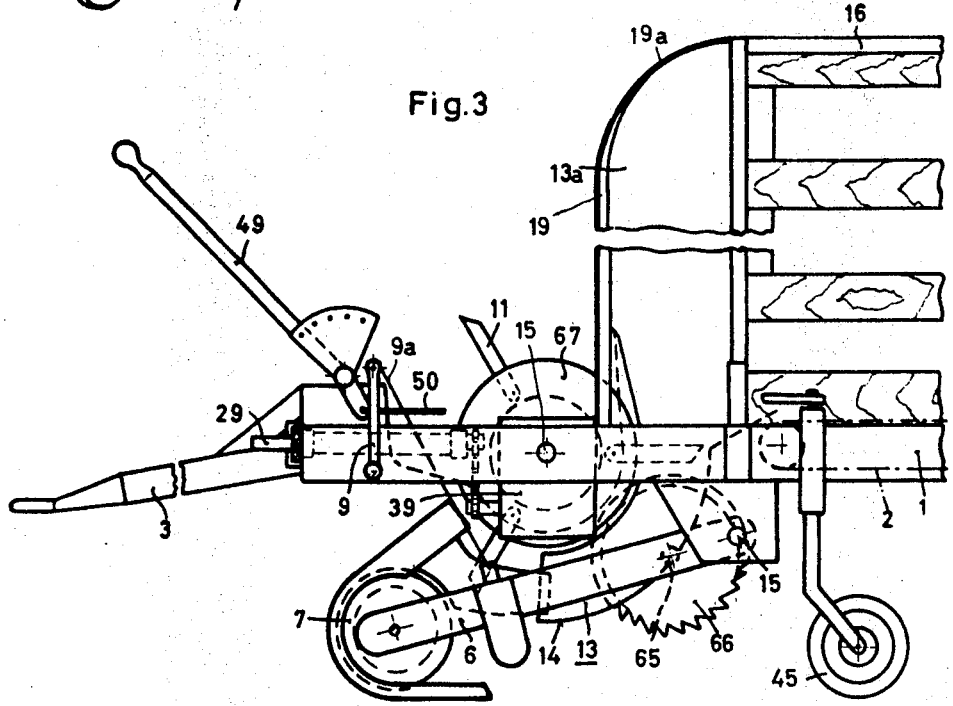
FIG. 3 is a partly sectioned side elevation of the pickup and conveyor mechanism of a somewhat modified embodiment on a larger scale.

Turning now to the embodiment of FIGS. 3 and 4, the raising of the pick-up drum 7 is effected by a winch operated by the detachable hand crank 9 through pull rope 9a. The drive leads in this embodiment from connection shaft 29 and chain 30 to a sturdy worm gearing 39, the worm gear shaft 40 of which can be coupled by means of a dog clutch 41 directly to the through-shaft 42 of the conveyor drum 10 which is of substantially identical construction as that described in connection with the embodiment of FIGS. 1 and 2 (see FIGS. 6 and 7). The eccentric 36 for the pull rod 37 for the step drive of the roller or scraper floor 2 is mounted on the left hand side of the vehicle in this embodiment directly at the free end of the worm gear shaft 40. Also in this embodiment the drive mechanism for the scraper floor 2 is of the well-known wheel and ratchet type, wherein the advance of the floor can be adjusted. For this purpose, a hand lever 49 and connecting rod 50 are provided.

In this embodiment the pick-up drum 7 is driven from the intermediate shaft 47 through a belt 18, and this intermediate shaft is driven by a chain drive 46 from the conveyor drum 10. Since the intermediate shaft 47 is co-axial with the point of articulation 15 of the cantilever 6, the tension of the belt is not affected by the raising or lowering of the pick-up drum 7. The conveyor channel 13 ends substantially at the level of the loading area.

The vehicle has two main wheels 43. An adjustable supporting wheel 44 (FIGS. 1 and 2) or two supporting wheels 45 (FIG. 3) mounted on the vehicle may serve for the support of the vehicle when parked.

Manner of operation: a towing device such as a tractor pulls the attached loading and transporting machine over the goods to be loaded while the goods are generally lying on the field in swaths, which goods are engaged by the pick-up drum 7 and are conveyed into the conveyor duct 13. There they are taken over by the prongs 11 of the conveyor drum 10 and are brought in the conveyor duct 13 substantially to the level of the loading area, where the conveyor prongs 11 are withdrawn from the conveyor duct 13. The further transport upward i.e., up to the height of the superstructure 16 of the vehicle takes place by the pushing action of the subsequent goods which are thereby compressed in the loading space. The material which emerges from the duct at the level of the floor 2 will lie constantly over the discharge end of the duct so that the subsequently arriving material which is being conveyed by prongs 11 is forced to emerge against the pressure of the material already present at the top of the duct and to lift this material. Due to the weight of the quantity of material lying over the duct opening and partly hanging together with the material already lying on the scraper floor, the subsequently arriving material will be compressed quite strongly.

Subsequently, the material conveyed is forced onto the roller or scraper floor which, depending on the compression and height of loading desired, transports the same either continuously or at certain time intervals in the direction toward the rear end of the loading area, until it is damned up at the rear wall 38 of the superstructure 16. When the roller or scraper floor remains in operation subsequently, it must run under the goods conveyed so that further compression is affected. By the correct adjustment of the speed of advance of the roller or scraper floor any desired compression and height of loading may be attained even at a varying speed of driving the vehicle or a varying quantity of goods being transported per metre of driving distance covered.

After the filling of the loading space the pick-up drum 7 is raised by means of the hand lever 8 or 9, respectively, and the vehicle is driven to the unloading place without any further readjustment. There the hinged rear wall 38 of the loading space 16 is opened, and the goods are unloaded in a few minutes by operating the roller or scraper floor. The vehicle is ready for renewed use in approximately the same time as required for attaching any other trailer to the tractor. Accordingly, as a rule, the use of so-called interchange trailers may be dispensed with. The goods after they are unloaded are conveyed to the storage place by a second person using until the next load arrives.

In the embodiment of FIG. 3 moreover an additional appliance for the comminuting of the goods conveyed is illustrated which may be of advantage when loading cumbersome materials. On the bottom 14 of the conveyor duct 13 a shaft 65 is arranged on which a plurality of cutter discs or saw blades 66 (only one being shown) is mounted, which protrude into the conveyor duct through slots and are interspersed with the conveyor prongs 11. The shaft 65 turns at a suitable rotational speed, so that the goods conveyed while passing through the conveyor duct are comminuted to the size of the spacing of the discs 66 from one another. This cutting device requires little power.

FIG. 5 shows in side elevation a further embodiment of a loading machine, in which conventional push rods 52 are used as the conveyor members, which are studded with teeth 52a, while the pick-up drum is kept at a constant distance from the soil by a slider shoe 53. Its drive is from the gear box 39 to the intermediate shaft 47 by a crossed belt 47a and therefrom by a belt or chain 47b. The drive of the push rods 52 is effected through a chain 43 and a crank shaft 54 turning counterclockwise, as viewed, so that the loading can be carried out through a funnel-shaped conveyor duct 13b into the open frontal face of the superstructure 16 of the vehicle.

While I have shown and described several embodiments in connection with the present invention, it is understood that the same is not limited thereto but is susceptible of numerous changes and modifications within the spirit and scope thereof as known to a person skilled in the art.

I claim:
1. A method for the loading and compressing of material in the form of blades, stalks and the like, comprising the steps of harvesting the material from the soil in a forward direction, delivering said material to an enclosed conveyor duct having substantially rigid walls, compressing said materials by the resistance of material already present above the point at which new materials enter said conveyor duct, forcing said materials through said conveyor duct so that they are pushed out from said duct in an upward direction into a loading chamber and then carrying off the materials from said duct in a substantially horizontal direction.

2. The method according to claim 1, further comprising the step of varying the conveying velocity of the materials in a substantially horizontal direction relative to the conveying velocity of the materials in an upward direction.

3. The method according to claim 1, wherein the materials are pushed out of said duct at the entrance of said loading chamber against materials already present in said loading chamber.

4. The method according to claim 1 together with the step of confining said materials at least in the direction in which they are carried off so as to additionally compress said materials.

5. A method according to claim 1, wherein the conveying velocity of the materials in the substantially horizontal direction, relative to the conveying velocity of the materials in an upward direction, is varied depending upon the compression and height of loading desired.

References Cited

UNITED STATES PATENTS

| 1,463,492 | 7/1923 | Varland | 214—519 XR |
| 2,381,620 | 8/1945 | Russell | 100—189 XR |

FOREIGN PATENTS

| 649,350 | 8/1937 | Germany. | |

ALBERT J. MAKAY, Primary Examiner